United States Patent [19]

Smith

[11] 4,453,785
[45] Jun. 12, 1984

[54] MODULAR CABINET FOR DIFFERENT VIDEO GAME CARTRIDGES, CASSETTES, AND INSTRUCTION BOOKLETS

[76] Inventor: Richard D. Smith, 28640 Vista Madera, San Pedro, Calif. 90732

[21] Appl. No.: 312,390

[22] Filed: Oct. 19, 1981

Related U.S. Application Data

[63] Continuation-in-part of Ser. No. 138,222, Apr. 7, 1980, Pat. No. 4,306,655.

[51] Int. Cl.³ .............................................. A47B 81/06
[52] U.S. Cl. ......................................... 312/10; 312/12; 206/387
[58] Field of Search .................... 312/8, 9, 10, 12, 15, 312/111, 273, 324, 257 A; 206/387; 211/40

[56] References Cited

U.S. PATENT DOCUMENTS

| | | | |
|---|---|---|---|
| 1,452,132 | 4/1923 | Weeks | 312/8 |
| 2,321,794 | 6/1943 | Braun | 312/10 |
| 3,677,396 | 7/1972 | Staar | 312/10 |
| 3,710,900 | 1/1973 | Fink | 312/10 |
| 3,752,551 | 8/1973 | Clark | 206/387 |
| 3,779,621 | 12/1973 | Carless | 312/15 |
| 3,812,537 | 5/1974 | Grae et al. | 206/387 |
| 3,889,817 | 6/1975 | Berkman | 206/387 |
| 3,997,220 | 12/1976 | Mayer | 312/242 |
| 4,111,502 | 9/1978 | Kessler | 206/387 |
| 4,235,490 | 11/1980 | Schwartz et al. | 312/15 |
| 4,306,655 | 12/1981 | Smith | 206/387 |

Primary Examiner—Victor N. Sakran
Attorney, Agent, or Firm—Evanns & Walsh

[57] ABSTRACT

A cabinet or container for holding a plurality of objects of different shapes and sizes in an organized manner, making it possible to easily retrieve any desired object. The cabinet is particularly adapted for holding VHS, Beta video cassette tapes, and Atari, Mattel Intellivision video game cartridges, and instruction booklets and audio cassete tapes. The cabinet has an open side, constructed to receive any one of a plurality of face plates or panels. The panels have groups of rectangular openings of shapes and sizes adapted to have particular objects inserted through the openings. The interior or the cabinet is constructed to receive and support objects inserted through the openings in a face plate. Partal partition members are provided at the back, to provide spacers between certain objects and to otherwise limit the distance the objects are moved into the cabinet. Supporting ribs or shelves are provided on inside walls of the cabinet for supporting objects. One or more divider members are insertable into the cabinet, preferably vertically, to provide supporting surfaces for receiving and supporting objects of different sizes that are insertable through openings in a face plate.

1 Claim, 18 Drawing Figures

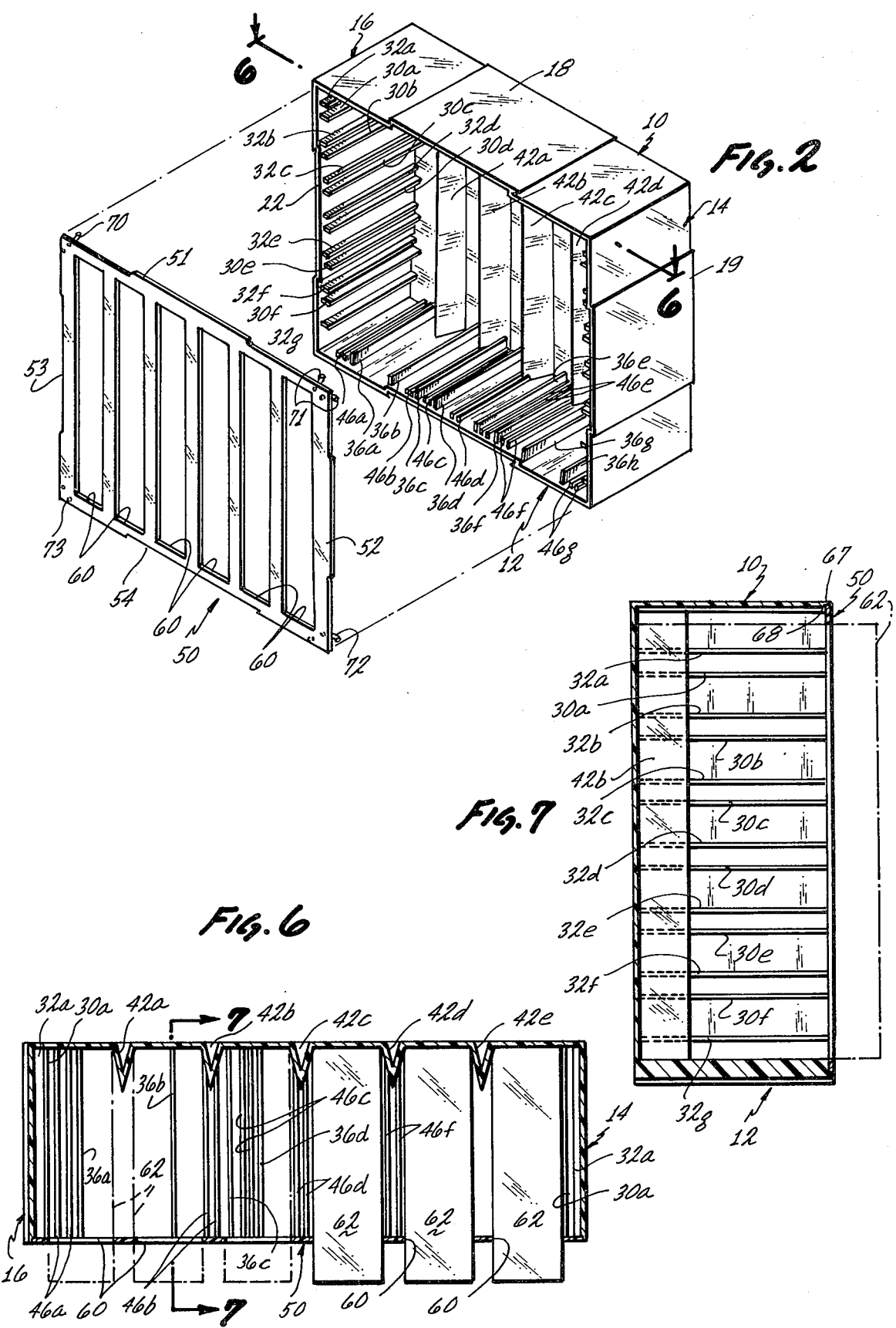

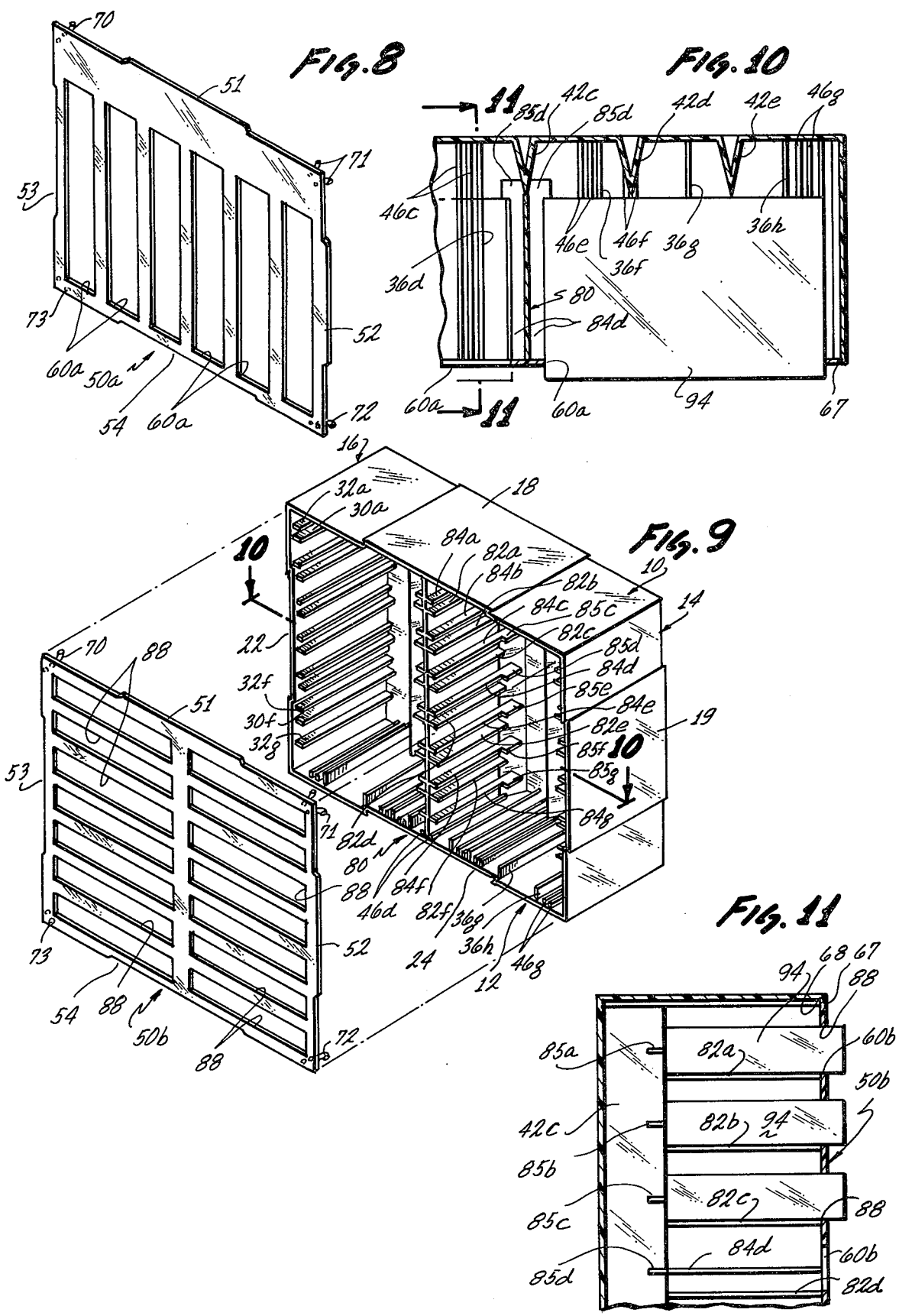

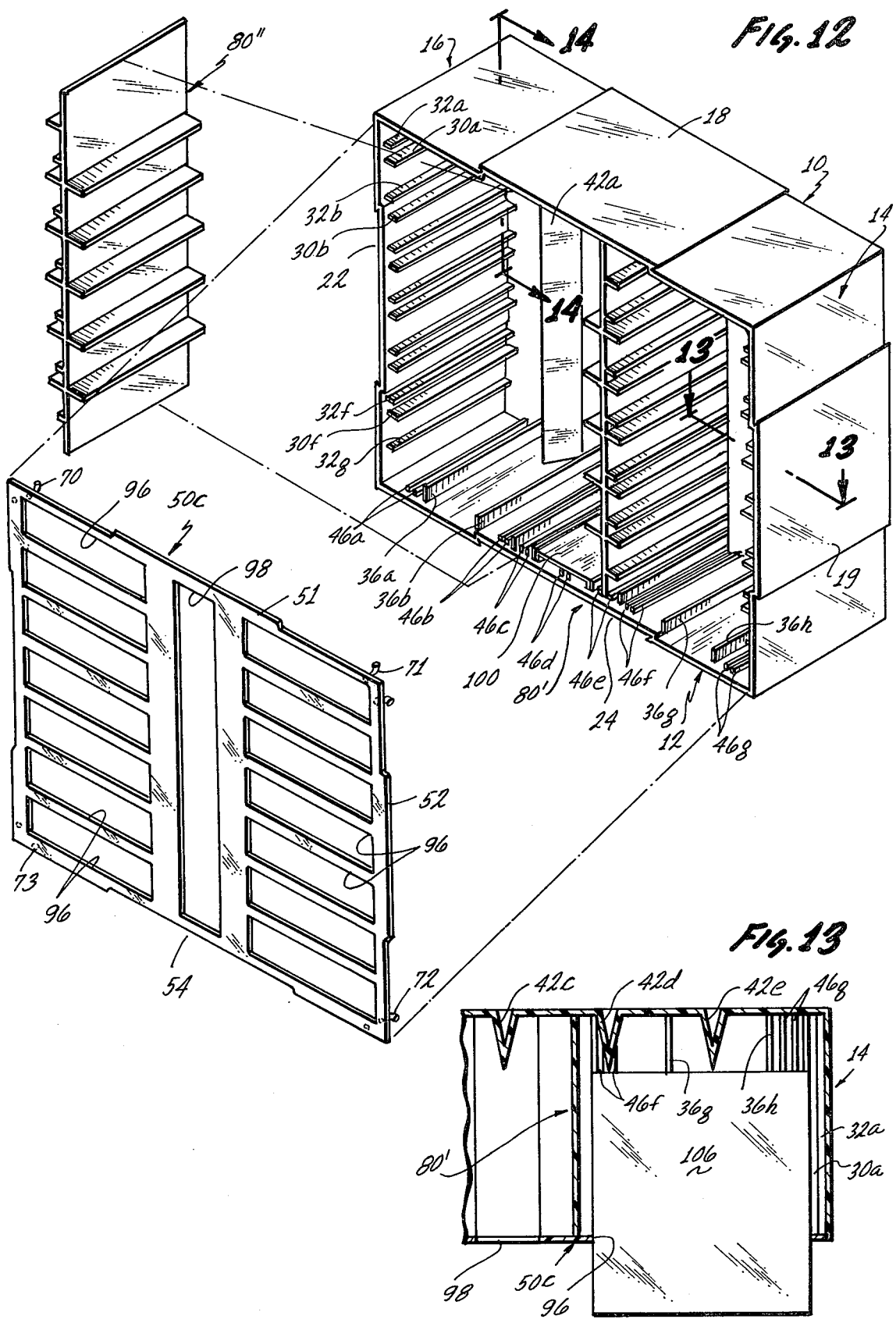

MODULAR CABINET FOR DIFFERENT VIDEO GAME CARTRIDGES, CASSETTES, AND INSTRUCTION BOOKLETS

The subject application is a continuation-in-part of Ser. No. 138,222, filed Apr. 7, 1980 now U.S. Pat. No. 4,306,655.

BACKGROUND OF THE INVENTION

1. Field of the Invention

The filed on the invention is broadly that of storage containers, holders or cabinets, but more especially, the field of the invention is that of a particularized storage cabinet or container adapted for suitably holding and storing video game cartridges, VHS and Beta video cassettes and audio cassettes of various types and sizes and for also containing and storing instruction booklets for use with the games. The invention is particularly adapted for, but not limited to, use with VHS, Beta video cassettes; Atari, Mattel Intellivision video game cartridges and associated instruction materials, and audio cassette tapes.

2. Description of the Prior Art

The utilization of video games has become extremely widespread in connection with television sets and amusement devices having a screen on which types of video games can be played in response to controls. Such video games cartridges are available in various sizes, several of the popular ones being identified in the foregoing. Typically the cartridges are in the form of printed circuit boards. The use of audio and video cassette tapes has also become widespread. The tape cassettes are also available in different sizes.

Because of the number and quantity of cartridges and cassettes available and the varying shapes, and instruction booklets needed for play, the problem of maintaining and storage of the video game cartridges and cassettes in such a way as to make possible the handy retrieval and utilization of any particular one that has become intensive. Thus, an intensive need exists for a container, chest, or cabinet capable of holding all the cartridges and cassettes in such a way that they are kept or held in an organized way readily available for easy retrieval of an individual cartridge of cassette, as well as providing a ready access to game instruction booklets.

There are various different video cartridges and cassettes presently available as identified above. Because of differences in their sizes and shapes a problem has been presented in the availability of a holding cabinet that will accommodate to the different shapes, and sizes in a way to provide organization and system so that any desired one can be quickly and readily retrieved for use.

The particular need identified in the foregoing has not adequately been filled in the prior art, particularly in the sense that a cabinet or a holder has not been available having the needed characteristics as identified in the foregoing, and further not having the characteristics of providing for uniform, systematic, organized cartridge, cassette, and instruction booklet storage.

The herein invention meets the needs identified in the foregoing and fulfills the deficiencies in the prior art as elucidated, preferred exemplary forms of the invention and modes of utilization being described in detail hereinafter.

SUMMARY OF THE INVENTION

In a preferred exemplary form of the invention, it takes the form of a cabinet or container, having a particular construction to be able to hold and retain in an organized way a plurality of objects of different shapes and sizes. The cabinet is particularly constructed to be adapted to hold the VHS and Beta video cassette tapes; and Atari, Mattel Intellivision video game cartridges, along with associated instruction materials, and audio cassette tapes.

The capabilities of the cabinet are realized by way of a unique construction. The cabinet has an open side and a plurality of face plates or face panels are provided, which removablely fit the cabinet to close the open side. The face plates are provided with different arrangements of rectangular openings, the openings being of particular shape and size, to receive individual of the objects to be stored in the cabinet. Some of the face plates have groups of openings, similar in size and shape.

The cabinet itself has an internal construction such that the same cabinet can be used with all the different face plates, the internal construction being such as to accommodate all of the different objects that are accommodated by the different face plates. Preferably the back wall of the cabinet has spaced inwardly extending partial partitions, or rib members, which served as spacers between objects that are inserted through a face plate having vertical rectangular openings. Additionally these members serve as abutments which limit the inward movement of objects which are inserted through the plates having horizontial rectangular openings.

The side (or end) walls of the cabinet have spaced inwardly extending parallel ribs members of shelves which serve to assist in supporting objects that are inserted through a horizontial rectangular opening in a face plate.

The versatility of the invention is augmented by way of the provision of partition or divider members, which are insertable into the cabinet, preferably in a verticial position. Rib members on the inside of the bottom and the inside of the top of the cabinet provide guide ways for the divider members. A single divider member may be utilitized, or on the other hand, a plurality of the divider members may be utilitized such as two or four. The single divider member is positioned in a center position. It is provided with parallel extending rib or shelf members so that an object inserted through a rectangular opening in a face plate can be supported on the shelf members which are in horizontial alignment with corresponding shelf members, on the inside surfaces of the end walls of the cabinet.

The versatility of the cabinet can be further improved by utilitization of two spaced divider members, similarly insertable at intermediate positions in the cabinet, whereby other objects of different sizes, insertable through horizontial openings in a face plate can be supported between the diyider members and the end walls of the cabinet.

In utilitizing four divider members, two of them are inserted adjacent to end walls of the cabinet and two at the intermediate positions in the cabinet, whereby objects of another size insertable through horizontial openings in a face plate, can be supported between the divider members themselves.

In the light of the foregoing, the primary object of the invention is to realize in a holding cabinet or chest, the capability of a single cabinet that can accommodate the holding and retaining in a uniform way a plurality of different shapes and sizes of objects, particularly video game cartridges and audio tape cassettes and video tape cassettes in an orderly way which permits easy and convenient insertion and removal of the objects.

A further objects is to realize and achieve a structure as the foregoing wherein a plurality of different face plates or panels is provided which fit the open side of the cabinet, different face plates having different arrangements of openings of a size and shape to accommodate objects of different size and shape.

A further object is to realize and achieve the capability of the device by the provision of the plurality of the face plates having arrangements of rectangular openings of different sizes in vertical positions, in horizontial positions, and also in groups of openings of different sizes and shapes.

A further object is to realize and achieve the capability of the device by way of the provision on the inside of the cabinet, of side ribs or partial shelves spaced apart to accommodate supporting objects inserted through the openings, and further constructed to recieve one or more partitions or divider members having side ribs or shelves to accommodate supporting objects between the divider member and walls of the cabinet, or between two divider members.

A further object is to achieve compatibility in the device to accommodate all of the different cartridges and cassette tapes and to expansion of the volume of holding capability.

A further object and additional advantages of the invention will become apparent from the following detailed description and annexed drawings.

BRIEF DESCRIPTION OF THE DRAWINGS

FIG. 2 an exploded isometric view of the cabinet of FIG. 1 showing a front panel as used with it in one form of the invention;

FIG. 6 is a detail sectional view taken along the line 6—6 of FIG. 2;

FIG. 7 is a sectional view taken along the line 7—7 of FIG. 6;

FIG. 8 is a view of a different front panel used in a second form of the invention;

FIG. 9 is an exploded isometric view of a third form of the invention which includes an intermediate divider and a different front panel or cover;

FIG. 10 is a partial sectional view taken along line 10—10 of FIG. 9 showing cassettes in position;

FIG. 11 is a sectional view taken along line 11—11 of FIG. 10;

FIG. 12 is an exploded isometric view of a fourth form of the invention utilizing two dividers and another form of face plate;

FIG. 13 is a sectional view taken along the line of 13—13 of FIG. 12;

BRIEF DESCRIPTION OF PREFERRED FORMS OF THE INVENTION AND BEST MODE OF PRACTICE

As pointed out in the foregoing the cabinet of the invention is adapted for holding in a uniform, systematic organized way a plurality of different objects, more particularly video game cartridges, and video cassette tapes and audio cassette tapes. As examples of the objects the cabinet is constructed to contain and organize VHS video cassettes, Beta video cassettes, audio cassettes, Atari video game cartridges, and Mattel Intellivision video game cartridges. The objects are identified by way of example, the invention not being limited to these particular items but on the other hand the invention possesses the unique capability and versatility to accommodate itself to a wide variety of different shapes and sizes of objects of this type or other types.

Figure 1:
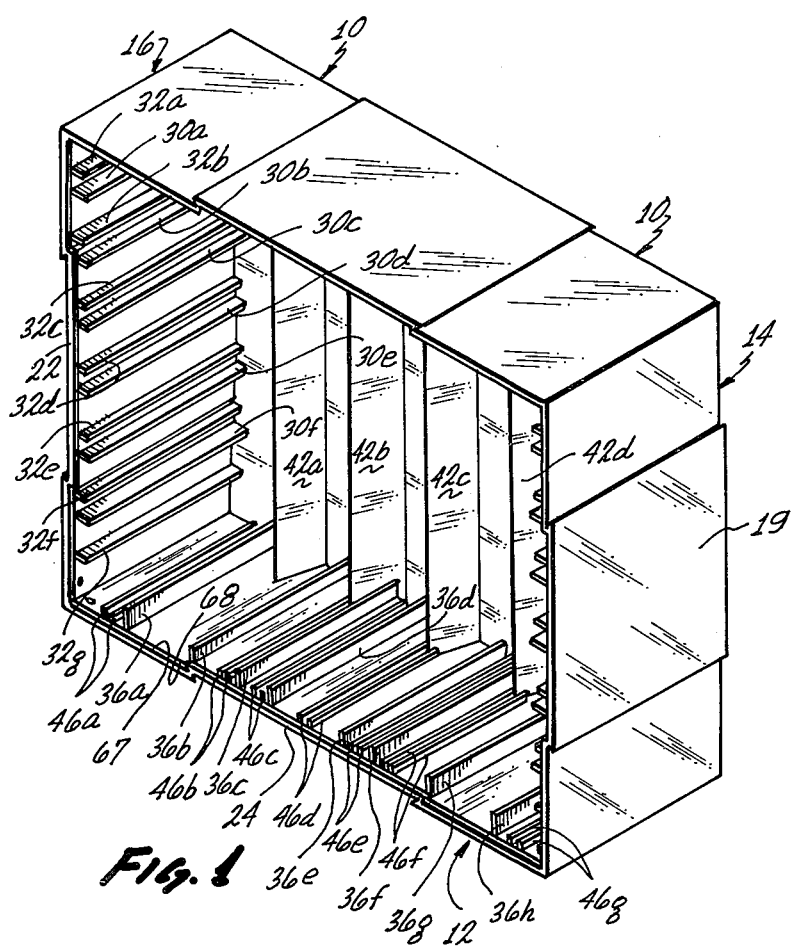
FIG. 1 of the drawings is an isometric view of preferred form of video game cartridge cabinet which is used for all of the species of the inventions.

FIGS. 1 and 2 of the drawings show a preferred form of the cabinet which as will appear is used for all different objects as identified in the foregoing, the cabinet adapting itself to containing and organizing all of the different objects by way of the use of the different face or cover plates or panels used with the cabinet and different insertable and removable dividers or partition members constructed for use with the cabinet.

FIG. 2 shows a particular face plate used with the cabinet adapted for containing in the cabinet, by way of example VHS video cassettes.

As shown in FIG. 1 and 2 the cabinet is rectangular having a top 10, a bottom 12 and end or side walls 14 and 16. The cabinet has a modular construction having extending tongue members 18 on the top and on the right end or side wall as shown at 19, and having grooves on the left end wall as shown at 22 and 24 on the bottom. See FIG. 3.

Figure 3:
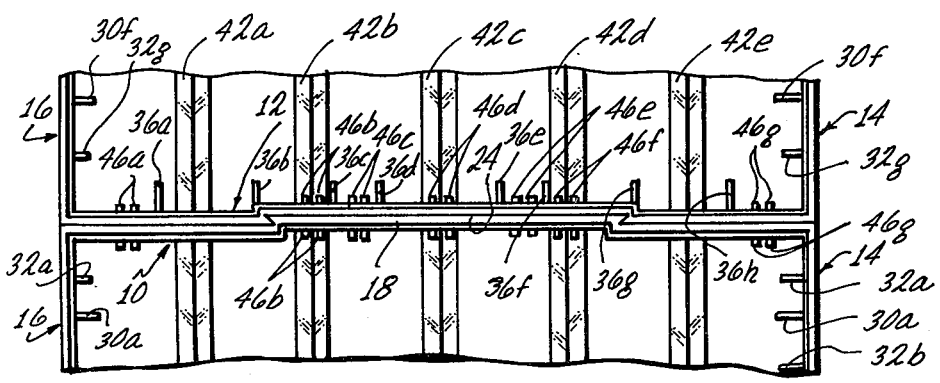
FIG. 3 is a sectional view illustrating how the cartridge cabinets which are in the form of modules can be fitted together.

The tongues and grooves can form joints whereby a plurality of cabinets can be joined together both vertically and horizontally, FIG. 3 showing how one cabinet is joined to the top of another so that an individual cabinet which as shown as a module which can be increased in size indefinitely as desired in vertical or horizontal directions so that it could cover a whole wall, for example, providing any size cabinet or holder for a complete library of the type of the objects referred to above, more particularly game cassettes and audio and video cassette tapes.

Referring to the cabinet as shown in FIG. 1 and referring to the inside of the left end wall it will be observed that extending inwardly from this wall are a plurality of spaced ribs or shelves including a group of longer ribs and a group of shorter ribs, the shorter ribs being parallel to and overlying the longer ribs. The longer ribs are identified by the numerals 30a, 30b, 30c, 30d, 30e, and 30f. The shorter ribs are identified by the numberals 32a, 32b, 32c, 32d, 32e, 32f and there being one additional separate shorter rib 32g.

On the inside wall of the other end wall 14 of the cabinet is an exactly similar and symmetrical array of ribs and since this array is identical it need not be described in further detail.

Referring to the bottom wall 12 of the cabinet it is provided with a plurality of upstanding partial partitions or ribs of limited height as identified at 36a, 36b, 36c, 36d, 36e, 36f, 36g, and 36h from left to right in FIG. 1. These partitions extend from the front edge of the bottom wall to the back wall of the cabinet. Reference will be made later to the exact spacing of these partial partitions or vertical ribs.

The cabinet itself and the face plates or panels used are designed to facilitate fabrication of them by way of plastic injection molding process.

The back wall of the cabinet as may be seen in FIGS. 1, 2, 6, and 7 has a group of five V-shaped or triangular shaped inwardly extending abutments as designated at 42a, 42b, 42c, 42d, and 42e. These abutments serve purposes as will become clear from the ensuing description. In the utilization of the invention as illustrated in FIGS. 1, 2, 3, 4, 5, 6, and 7 these serve to space objects inserted into the cabinet between them which in this particular utilization of the invention are VHS or Beta cassette tapes to limit the distance the objects move into the cabinet.

The numeral 46a designates a pair of relatively short upstanding ribs parallel to the rib 36a which are relatively closely spaced and which form a guide track for a vertical divider or partition member which can be inserted by being slid in and slid out as will be described presently. There are a series of these track ways as designated at 46a, 46b, 46c, 46d, 46e, 46f, and 46g. Some of these guide tracks as shown at intermediate positions extend to the abutments extending inward from the back wall as will be referred to again presently.

Having reference to the upstanding members forming guide tracks on the bottom wall 12 it will be understood that a corresponding symmetrical array of inwardly extending rib members and track members are provided on the inside of the top wall 10 of the cabinet.

In utilizing the cabinet to accommodate holding VHS or Beta cassette tapes a face plate or panel is utilized as designated at 50 in FIGS. 2 and 7, the face plate having extensions at the top and the right side as designated at 51 and 52 and having cutouts or recesses 53 and 54 at the left side and at the bottom to accommodate the tongues and grooves on the cabinet as designated at 18 and 19 and 22 and 24 in FIG. 1.

The face plate 50 has formed in it six similar rectangular openings one of which is designated by the numeral 60. These openings are uniform symmetrical openings and are positioned to have inserted through them the VHS or Beta cassette tapes as may be seen in FIG. 6, one of cassettes being designated by the number 62. The cassettes protrude through the front openings far enough so that they can be easily individually removed or retrieved by hand. FIG. 6, is a sectional view illustrating how the cassettes fit into the cabinet in between the abutments 42, at the bottom cassettes resting on the relatively low guide track ways identified by number 46.

Figure 4:
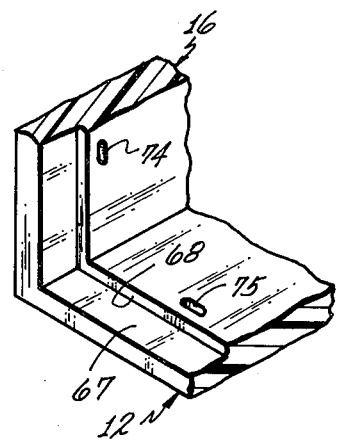
FIG. 4, is a detail isometric view of a corner of the cabinet of FIG. 1 illustrating the recess that the front or lid snaps into.

FIG. 4, is a partial enlarged isometric view of one corner of the cabinet at the end wall 16 and bottom wall 12 showing that there is a continuous recess 67 in the walls of the cabinet at the front opening as shown forming a square shoulder 68, that is back from the edge of the wall. The face plate 50 fits into this recess so that it comes flush with edges of the walls of the cabinet. Preferably the face plate 50 is formed to have a decorative external surface to present a pleasing appearance.

Figure 5:
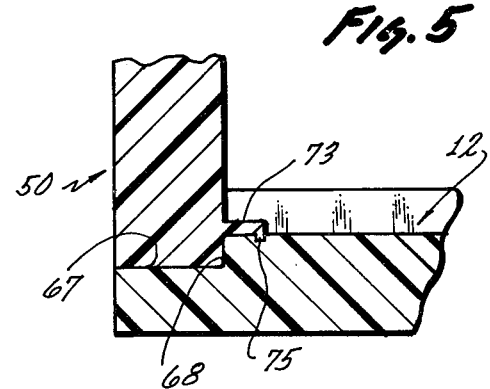
FIG. 5 is a detail sectional view illustrating the lid or front panel snapped into place.

At each corner of the face plate 50 are detent catches or hooks as designated at 70, 71, 72, and 73. These members are flexible and can be inserted into small openings in the cabinet walls to which are designated at 74 and 75 as shown in FIG. 4. The enlarged view FIG. 5 illustrates how the face plate 50 is removably attached to the open side wall of the cabinet. The catches as shown at 70–73 are sufficiently flexible that the face plate can be manually removed and reattached as desired.

FIG. 8 of the drawings illustrates another utilization of the invention wherein it is modified to accommodate the containing of another object which in this instance, by way of example, is a Beta Cassette. The face plate is designated at 50a. It is in all respects like the face plate 50 previously described having a similar set of six rectangular openings one of which is designated at 60a. The openings are like those in the face plate 50 with the exception that they are slightly shorter in vertical dimension in order to accommodate this particular cassette. These cassettes fit into the cabinet in the same manner as illustrated in FIG. 6, the arrangement being similar to that described with the reference to the VHS cassettes, the cassettes being in an orderly array and protruding through the openings in the face plate 50a to facilitate easy grasping removal. Face Plate 50a is held to the cabinet in the same manner as described in connection with face plate 50.

FIGS. 9, 10, and 11 illustrate another manner of utilization of the invention which is adapted for use for holding and organizing another object of different size and shape which in this particular example is the audio cassette, by way of example, or any other cassette of this size and shape. The cabinet is the same one as shown in FIGS. 1 and 2.

For this utilization a single intermediate divider or partition is used as designated at 80. This partition is in the form of a flat panel having a vertical dimension corresponding to the dimension of the end walls 14 and 16 of the cabinet. It can be readily slid in to an intermediate position in the cabinet with its bottom edge accommodated between the ribs of the bottom guide track 46d with its top edge between ribs of the corresponding guide track on the inside of the top wall 10 of the cabinet.

On one side of the divider member 80 that is the right side it has an array of ribs or partial shelf members corresponding to those identified by the numeral 30 and 32 in FIG. 1, the identifying numerals in FIG. 11 being 82a, 82b, 82c, 82d, 82e, and 82f, 84a, 84b, 84d, 84e, 84f, and 84g. On the other side of the divider 80 are similar arrays of ribs or shelf members exactly like those just described and corresponding to those on inside of the end wall 6 of the cabinet. The shorter ribs 84 have greater extent at their inner ends forming square shoulders as shown at 85a, 85b, 85c, 85d, 85e, and 85f. FIGS. 9 and 10 show the cabinet with the intermediate divider or partition member 80 in position. The shoulders 85 limited inward movement of certain cartridges.

In the present utilization of the invention a different face plate is used as designated at 50b. It is in all respects like the previously described face plates 50 and 50a except that it has in it two series of seven each of horizontal rectangular openings as shown, one of them in the right hand series being designated at 88. This face plate fits the open side of the cabinet as described in the previous embodiments.

FIGS. 9 and 10 shows that partition or divider 80 in position, its inner edge abutting against the abutment member 42c as shown.

The cassettes such as for example audio cassettes are inserted in a horizontal position through the openings such as the opening 88 in the face plate 50b. One of the cassettes is identified by the number 94 in FIG. 11. From the figures it will be observed that the ends of the cassettes are supported on the longer of the horizontally extending ribs or shelves that are formed on the inside of the end wall 16, on the inside of end wall 14 and on both sides of the divider or partition member 80, the shorter ribs or shelves on these four surfaces abutting against surfaces of the cassettes for retaining them in position.

As may be observed in this utilization of the invention the cassettes in position move in against the shoulders 85a through 85f as can be seen in FIGS. 9, 10, and 11 with openings as designated at 88 so that they can be easily grasped, retrieved, and removed.

Figure 14:
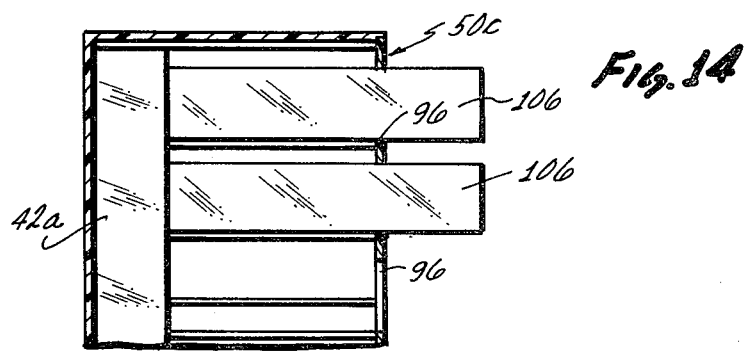
FIG. 14 is a sectional view taken along the line of 14—14 of FIG. 12.

FIGS. 12, 13, 14 illustrate another utilization of the invention which is particularly adapted for storage of an object of another shape and size which may be specifically, for example, an Atari cartridge. The cabinet is the same one as used in the previous utilizations.

In this form of the invention a face plate is utilized as designated at 50c which is similar to the face plate 50b but not identical to it. Like the face plate 50b it has two series of seven similar rectangular openings one of which is designated at 96. Between the two series of horizontal openings there is a single vertical rectangular opening as designated at 98 for a purpose which will be described presently. This utilization of the invention is particularly adapted for uniform storage and organizing of cartridges having the size and shape of the contemporary Atari cartridge.

In this form of the invention two spacers or dividers are utilized one of which is designated at 80' and other at 80''. These divider members are like the previously described divider 80 except that the shorter ribs on the inward sides of these dividers are omitted. Since there dividers are otherwise like dividers 80 no further description is necessary.

The two spacer or divider members 80' and 80'' are insertable into the cabinet with their bottom ends moving in the guide tracks formed by the spaced ribs 46c and 46e and their upper ends fitting into the opposite guide tracks formed on the inside of the top 10 of the cabinet. The dividers are inserted into the said guide tracks spaced from each other and which are opposite sides of the inwardly extending abutment member 42c as may be seen in FIGS. 12 and 13.

FIG. 12 shows how the two spacer or divider members 80' and 80'' are inserted in position in the cabinet. In addition to the spacer members a platform member or plate 100 is inserted into the cabinet between the bottom ends of the spacer members 80' and 80'' as may be seen in FIG. 12 over the two ribs forming the guide track 46c. This space between the partition members is provided for the storage of instruction manuals, brochures, and this type of printed material, which can be inserted through opening 98.

In this utilization of the invention the cartridges are inserted horizontally through the openings such as the opening 96 in face plate 50c so that they come into position as illustrated in FIG. 13. The side edges of the cartridges one of which is designated at 106 in FIG. 13 are supported on the rib or shelf members of larger extent as previously described, that are on the inside of the end walls 14 and 16 and that are on the outside of the two spacer members 80' and 80''. The shorter rib or shelf members on all of these four surfaces abut against side walls or end walls of the cartridges to hold the cartridges in their uniform organized positions.

As may be seen in FIG. 13 the cartridges come into position in the cabinet into abutting relationship with the extending abutment members 42a, 42b, 42d, and 42e.

FIGS. 15-18 illustrate another utilization of the invention.

In this form of the invention a face plate 50d is used which is similar to the face plate 50c as previously described. It has two series of seven generally rectangular openings in it arranged as shown, one of them being identified by the numeral 110. These openings have a shape including a transverse enlargement so that they will accommodate a particular object which in this instance is a Mattel Intellevision cartridge. The face plate 50d has an elongated intermediate vertical opening as designated at 114. In this utilization of the invention four spacers or dividers are like the previously described dividers 80' and 80''. All of the dividers are insertable and removable from the cabinet in the same manner as the dividers previously described, the lower ends and upper ends of the dividers fitting into guide tracks on the inside of the bottom and top walls as already described.

Figure 15:
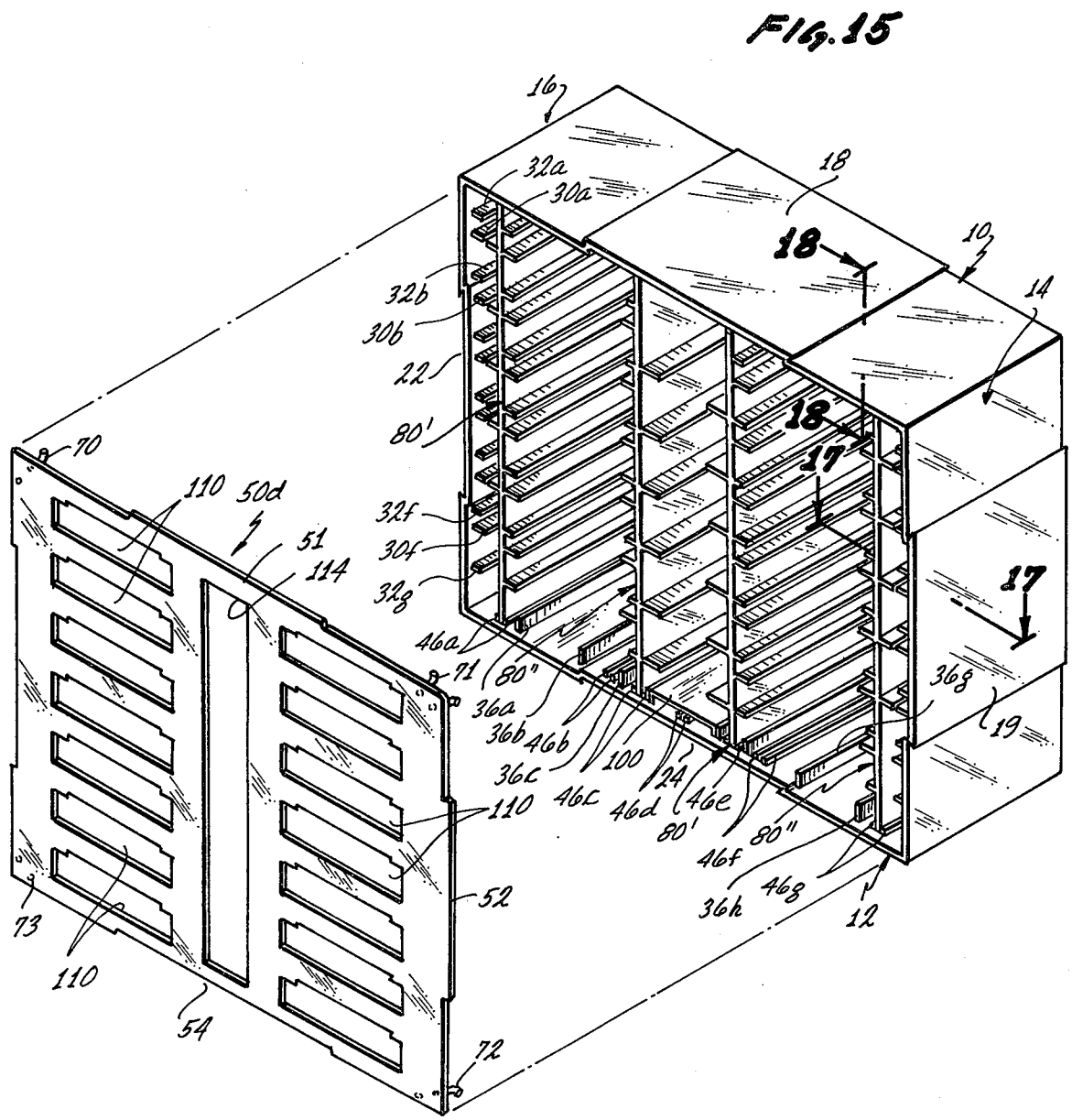
FIG. 15 is an exploded isometric view of a fifth form of the invention wherein four dividers are utilized and another form of front panel or face plate.
Figure 16:
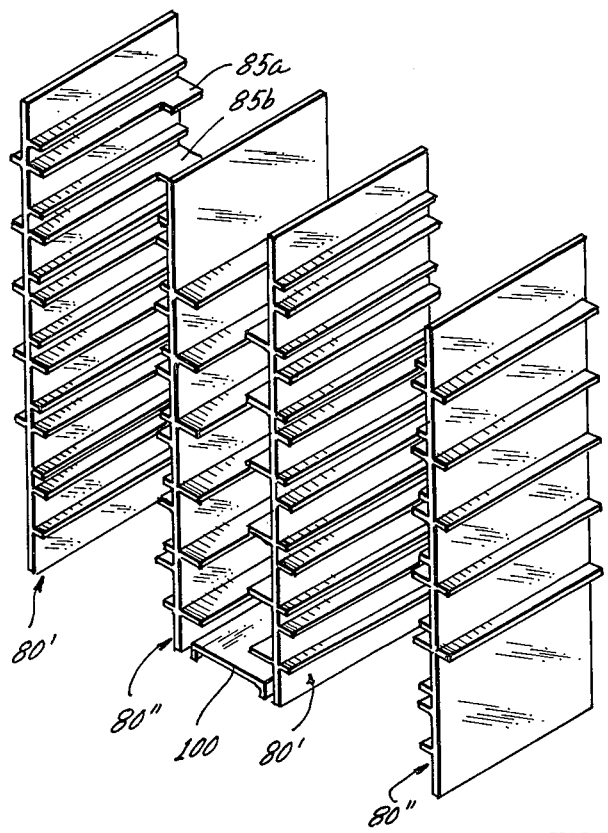
FIG. 16 is an isometric view showing the dividers of FIG. 15.

FIG. 15 illustrates the positions in which the dividers are inserted in this utilization of the invention. The left hand divider 80' is inserted with its bottom edge in guide track 46a and a top edge in corresponding guide track on the inside of the top 10 of the cabinet. Its horizontal ribs or shelves are flush with and come into abutting relationship with the longer ribs or shelves on the inside of the end wall 16 as may be seen in FIG. 15. The right hand partition of divider 80'' is inserted with its lower edge in the guide track 40g and its upper edge in the corresponding guide track on the inside of the top wall 10 of the cabinet, its extending rib or shelf members abutting against the corresponding longer rib or shelf members on the inside of the end wall 14 of the cabinet.

The intermediate dividers 80' and 80'' are inserted with their bottom edges in the guide tracks 46c and 46c and their top edges in the corresponding guide tracks on the inside of the top wall of the cabinet. These two dividers are in position on opposite sides of the middle inwardly extending abutment 42c as may be seen in FIG. 15. As stated this utilization of the invention is partcularly adapted for objects having the shape and size of the contemporary Mattel Intellivision cartridges one of which is identified by the numeral 116 in the figures. These cartridges have and end that is formed on the slant as may be seen at 117 of FIG. 18.

Figure 17:
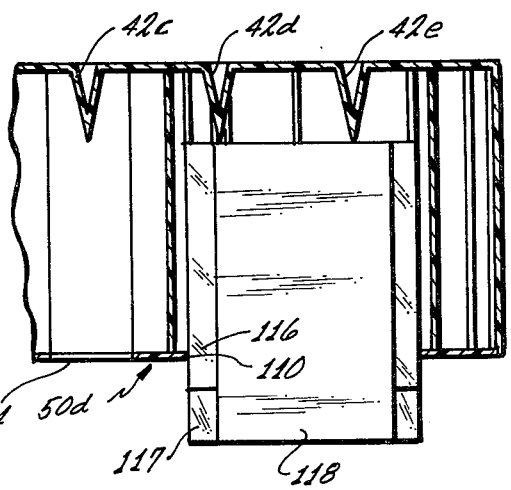
FIG. 17 a sectional view taken along the line 17—17 of FIG. 15.
Figure 18:
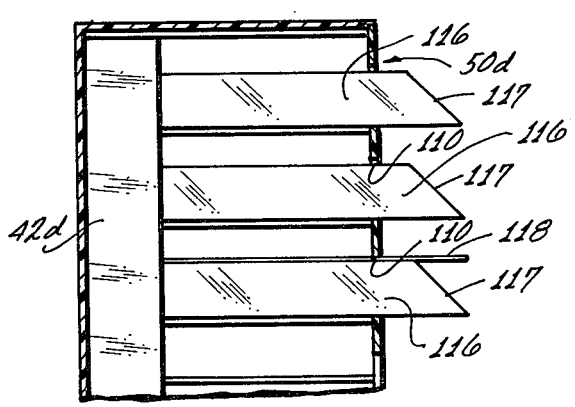
FIG. 18 is a sectional view taken along the line 18—18 of FIG. 15.

The cartridges are inserted through the face plate 50d through the openings as shown at 110 and are supported on the longer extending rib or shelf members on the sides of the spacer members 80', 8'', 8', and 80''. FIGS. 17 and 18 illustrate the positions of the cartridges in the cabinet. The inner ends of the cartridges abut against the shoulders 85a–85f on the ends of the shorter ribs 84 on the inside of dividers 80' and 80''. The shorter rib or shelf members on the sides of the cartridges retain them in position The ends of the cartridges 116 extend outwardly through the openings such as 110 so that they can be easily grasped and retrieved. Numeral 118 in FIG. 18 designates an instruction card which has been inserted through the same opening that has received the corresponding cartridge.

From the foregoing those skilled in the art will readily understand the nature of the invention, its construction, and its manner of utilization to realize all of the objects as set forth in the foregoing. The invention is extremely versatile in its capability to adapt to the storage and organization of objects of different shapes and sizes and more especially the various video and audio cassette tapes and video game cartridges and instruction booklets that have specifically been identified. The same cabinet is utilized for all of the articles.

Different but easily fabricated and inexpensive face plates are used with the same cabinet to accommodate objects of different sizes and shapes. The objects are insertable through openings in the face plate and are supported within the cabinet. By the use of one or more divider members, within the cabinet, and the different face plates the cabinet is extremely versatile in accommodating itself to the holding of the objects, that is the cassettes and cartridges of different sizes and shapes. Thus, the capabilities are realized of being able in a simple and inexpensive way, to store and retain the objects in an organized and categorized way making it easy to retrieve any desired object.

The foregoing disclosure is representative of perferred forms of the invention and is intended to be interpreted in an illustrative rather than a limiting sense, the invention to be accorded the full scope of the claims appended hereto.

What is claimed is:

1. A modular cabinet unit constructed for holding in uniform positions, a plurality of objects which may be video game cartridges and audio and video tape cassettes of different sizes and shapes, said cabinet haivng an open side constructed to receive any one of a plurality of different face plates, each of said plurality of face plates having in it a plurality of rectangular openings, the openings in individual face plates each being of a size to have inserted through it a particular one of said objects, a plurality of face plates constructed to close the said open side of the cabinet, the said cabinet having an interior construction including means extending inwardly from its side walls in the form of ribs in a position to retain objects inserted through the openings in the face plate with the said objects held in uniform predetermined relationship permitting ready retrieval and removal through the openings in the said face plate, the cabinet having a wall opposite the said open side, said wall having spaced partition members extending inwardly from it a predetermined distance, said partial partition members being spaced at predetermined distances apart, a plurality of divider members insertable into the cabinet between its top and bottom walls and removable therefrom, the top and bottom walls having inwardly extending ribs to form guideways for the ends of the divider members, the divider members having relatively short extending ribs on opposite sides thereof which are aligned with ribs on the inside of the cabinet walls, the cabinet being of a size to accommodate having objects inserted in a position wherein the objects are supported on ribs extending on the sides of the divider members and the side walls of the cabinet.

* * * * *